Feb. 28, 1933.  L. J. MARINGER  1,899,581
HEATER
Filed Dec. 11, 1931
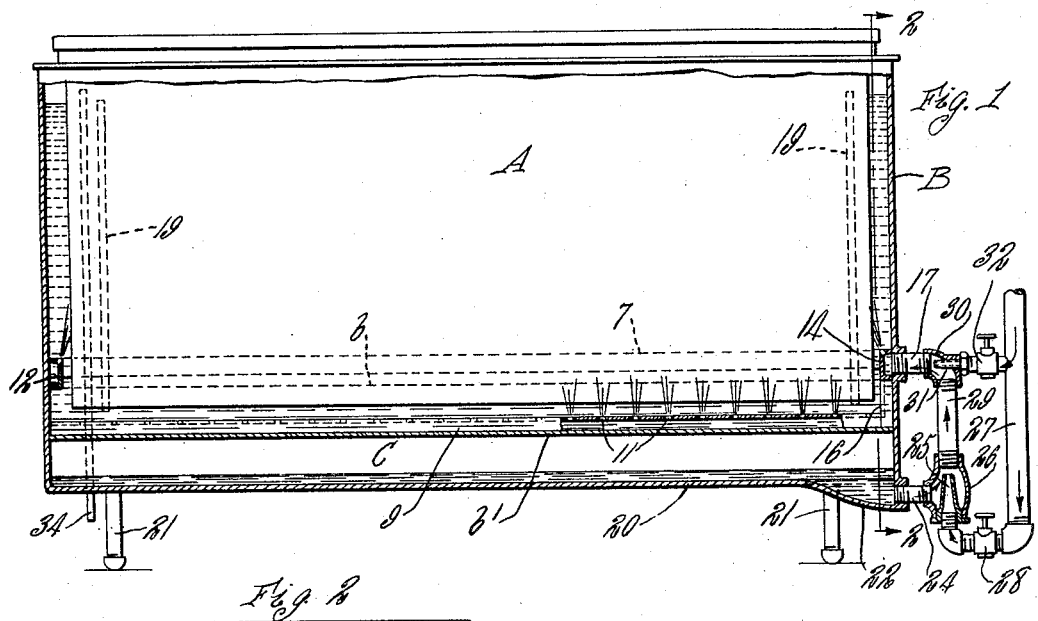
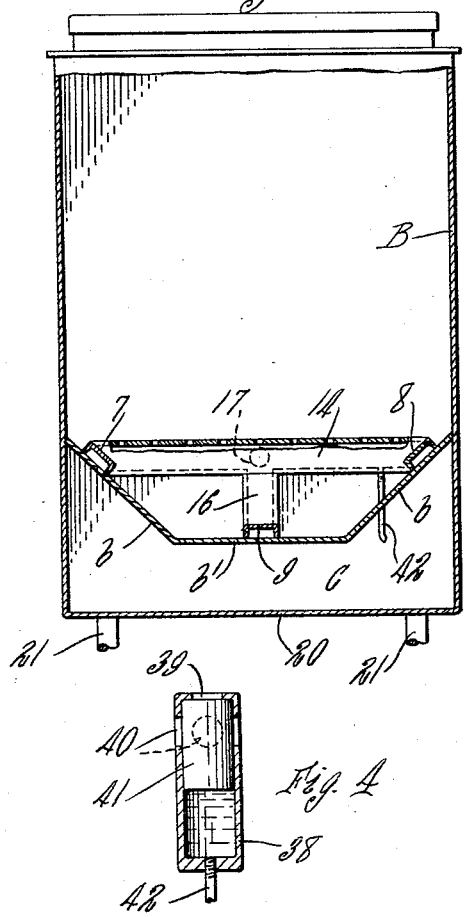
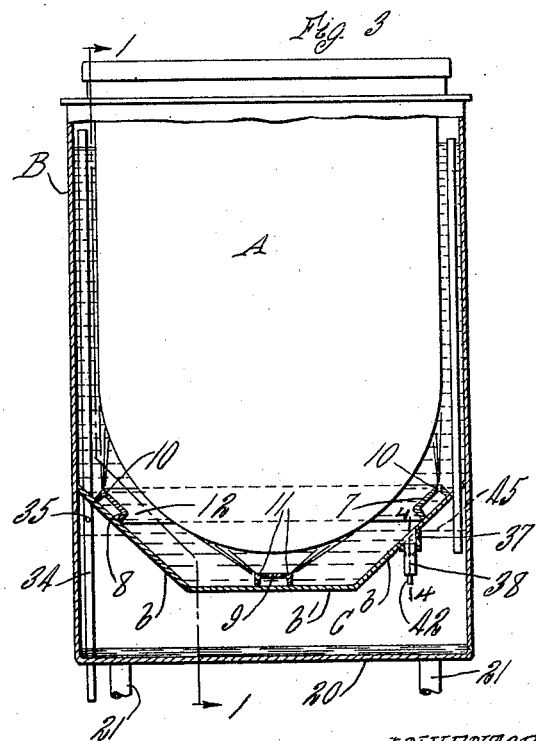
INVENTOR.
Lawrence J. Maringer
by Parker, Prochnow & Korner
ATTORNEYS.

Patented Feb. 28, 1933

1,899,581

UNITED STATES PATENT OFFICE

LAWRENCE J. MARINGER, OF BUFFALO, NEW YORK, ASSIGNOR TO R. G. WRIGHT & COMPANY, OF BUFFALO, NEW YORK

HEATER

Application filed December 11, 1931. Serial No. 580,334.

This invention relates to heaters of the kind in which a fluid is used for heating a liquid in a container to the desired temperature, and more particularly to the heating and circulating of the heating fluid.

In the pasteurization of liquids, such as milk, it is very necessary that no portions of the liquid be heated above a certain maximum temperature, and it is also desirable to raise the cold liquid to the pasteurizing temperature as quickly as possible and to maintain the liquid at a pasteurizing temperature for a period of time after such temperature has been attained. The invention, while illustrated in the accompanying drawing as applied to a pasteurizer, is not limited to be used only in connection with pasteurizers, since the invention may equally well be used on other types of heaters.

The objects of this invention are to provide a heater of this kind, in which the heating fluid may be maintained at approximately the maximum temperature in all parts of the heater; also to provide a heater of this kind from which heating fluid is withdrawn when the liquid has attained the required temperature; also to provide a heater with a storage container for the heating fluid, into which the greater portion of the heating fluid will pass when the circulation of heating fluid is interrupted; also to provide a heater of this kind in which the heating fluid overflows into the storage or over-flow container when the desired liquid level in the container has been reached; also to provide a heater in which fluid is withdrawn from the storage or overflow reservoir for recirculation through the heater; also to improve the construction of circulating and heating means for heaters in other respects hereinafter specified.

In the accompanying drawing:

Fig. 1 is a longitudinal sectional elevation of a heater embodying this invention on line 1—1, Fig. 3;

Fig. 2 is a transverse sectional elevation thereof, on the section line 2—2, Fig. 1, in the direction indicated by the arrows;

Fig. 3 is a similar section in the direction opposite to the arrows;

Fig. 4 is a sectional view on an enlarged scale on line 4—4, Fig. 3.

A represents a container for the liquid to be heated or pasteurized, which container may be of any suitable shape or form, that shown in the accompanying drawing being in the form of a vat, into which a quantity of material or liquid to be heated or pasteurized is introduced and in which the liquid remains until completion of the heating or pasteurization. B represents the tank into which the vat or container A extends, the tank being sufficiently larger than the vat A to leave a space around the vat in which the heating fluid may be circulated to impart its heat to the liquid to be heated through the walls of the container A. The tank B may also be of any suitable or desired shape, that shown having inclined walls or partitions $b$ near the lower portion thereof, terminating at the lower ends in a substantially horizontal bottom wall $b^1$.

In accordance with my improved heating and circulating system, I provide means for supplying heated fluid to different portions of the tank, so that all parts of the vat are subjected to substantially the same extent to the heated fluid, or in other words, so that all parts of the vat are subjected to the maximum temperature of the heated fluid. This can be most easily and effectively accomplished by providing means in the lower portion of the tank for directing heated fluid upwardly along the walls of the tank, and then removing excess fluid from the upper portion of the tank. In the construction shown for this purpose, the lower portion of the tank is provided near the opposite sides thereof with ducts 7 and 8 which may be in the form of channel shaped members having the edges of their flanges suitably welded, soldered, or otherwise secured to the inclined tank walls $b$ and, if desired, a third longitudinally extending duct 9 of similar shape may be secured to the bottom walls $b'$ of the tank. These channels preferably have suitable holes or apertures punched or otherwise formed therein at intervals so as to discharge jets of heated fluid toward the walls of the vat A. In the construction shown, the ducts 7 and 8 are provided with apertures 10 by means of which jets of heating fluid are projected upwardly along the upright walls of the vat A and the lower duct 9 is preferably provided at opposite sides with similar apertures 11 for directing heating fluid in opposite directions against the bottom of the vat A. Any other means for conducting and discharging heating fluid may be provided in place of the particular means shown. The channels described, however, are desirable in that they have the further advantage of reinforcing the portions of the tank to which they are secured, and this reinforcement is particularly desirable on the bottom and inclined walls of the lower portion of the tank, since these walls are subject to the greatest pressure of the water, when water is used as the heating fluid.

A similar duct 12 may be arranged on the rear wall of the tank and provided with suitable apertures for discharging heating fluid upwardly at the rear wall of the vat and this duct 12 preferably connects the two rear ends of the ducts 7 and 8. The front ends of the ducts 7 and 8 are preferably similarly connected to a transversely extending duct 14 similar to the duct 12, and also having apertures for discharging heating fluid upwardly against the front wall of the vat. The duct 14 is preferably connected with the lower duct 9 by means of a short connecting duct 16, although other means for supplying heating fluid to the lower duct 9 may be employed, if desired. By means of the construction shown, all ducts are interconnected, and consequently, heating fluid may be supplied to the heater by means of a single inlet pipe 17 extending through the front wall of the pasteurizing tank and communicating with the duct 14.

The heating fluid may be discharged from the tank B through one or more overflow or discharge pipes 19, two such pipes being shown in the construction illustrated, having their upper ends terminating at the upper level of the liquid in the tank. In this manner, the entire tank will be filled with fluid before any of the fluid is removed therefrom.

In accordance with my invention, an overflow or storage reservoir is provided into which the heating fluid passes after leaving the tank B, and this reservoir may be arranged in any suitable or desired location with reference to the heater. In the construction shown, this reservoir is formed in the lower portion of the heater tank below the inclined and bottom walls $b$ and $b^1$ thereof. This reservoir C is, in the construction shown, formed by extending the four walls of the tank B downwardly to the desired extent below the bottom of the tank, and a bottom wall 20 connects the side walls to form this reservoir C. 21 represents feet or legs by means of which the entire heater may be supported upon a floor. By arranging the storage reservoir or tank below the tank B, a very convenient arrangement results, so that the overflow pipes 19 may pass directly through the inclined walls $b$ and discharge into the reservoir C, and liquid may be withdrawn from this reservoir for heating and for circulation in the tank B, and for this purpose, the front end of the storage reservoir C may be provided with a depressed portion 22 to which a discharge pipe 24 may be connected.

Any desired means may be provided for heating the liquid, and this may, of course, be accomplished either in the storage reservoir C or during the flow of liquid to the distributing ducts in the tank B, or in both places. In the construction shown, the flow of liquid from the storage reservoir into the tank B is produced by means of a steam ejector including a steam nozzle 25 arranged within an ejector housing 26, steam being admitted to the ejector nozzle from a steam pipe 27 through suitable connections including a valve 28 for controlling the flow of steam to the ejector. The water or other heating fluid passes from the ejector housing through a pipe 29 to the inlet pipe 17, preferably through an elbow 30 which is shown as provided with one or more steam nozzles 31 arranged to supply steam to the fluid for heating the same. Steam for the heating nozzle 31 may also be supplied from the pipe 27, and as shown, is under the control of a valve 32. Any other means for heating the liquid and for imparting motion thereto to circulate the same in the tank B may be provided in place of the means described.

The invention thus far described operates to supply the hot water or other heating fluid to the tank in such a manner as to brush or produce a scrubbing effect upon the walls of the vat A throughout substantially the entire surface thereof, so that very effective transmission of heat from the heating fluid to the walls of the vat results. Since the warm fluid tends to rise, this tendency is added to the force imparted to the jets of fluid emerging from the orifices 10 and 11, thus causing an upward flow of the heating fluid, in spite of the cooling effect of the walls of the vat. Consequently, it is possible with the use of the arrangement shown to remove cooler liquid from the upper part of the tank through the overflow pipes 19. In case too much heating fluid is supplied to the heater, another overflow pipe 34 is provided, which has its upper or intake end arranged above the level of the overflow pipes 19, and which discharges any fluid entering this pipe below the bottom of the storage reservoir C. This overflow pipe preferably also has a vent or overflow aperture 35 in the upper portion of the storage reservoir C, so that excess liquid may be discharged from this reservoir, and so that air trapped in the top of this reservoir will not interfere with the filling of the same to the desired level.

When it is necessary to control accurately the extent to which liquid in the vat A is heated, as, for example, in pasteurizing liquids, it has been found that when the liquid in the vat A reaches the desired pasteurizing temperature, such temperature would be considerably exceeded, if the heating fluid were permitted to remain in the tank B, even if steam for heating and circulating the same were shut off. I have, consequently, provided means whereby the heating fluid or hot water can be withdrawn from the tank B immediately upon the attaining of the correct temperature by the liquid in the vat A. In the construction shown for this purpose, a liquid discharge passage 37 is provided in the lower portion of the tank B and this discharge passage is controlled by means of a valve arranged to be opened automatically when the circulation of heating fluid is interrupted. In the construction shown, the discharge passage 37 is provided with a plunger valve 38, shown more in detail in Fig. 4. This plunger valve is in the form of a cylinder through which the liquid must pass in flowing from the tank B to the storage reservoir C. For this purpose, the cylinder 38 is provided with an inlet opening 39 communicating with the tank B for the liquid and a plurality of discharge openings 40 communicating with the storage reservoir C. These openings are controlled by means of a plunger 41 arranged in the cylinder 38. The plunger is moved to its upper or closed position by means of pressure in the lower part of the cylinder 38, and this pressure is supplied by means of a duct 42, one end of which communicates with the lower end of the cylinder 38, and the other end of which receives fluid pressure from the conduit or duct 14, as shown in Fig. 2. Consequently, it will be obvious that when fluid under pressure is supplied to the duct 14, this pressure will be communicated by the small duct 42 to the cylinder 38, and will move the plunger 41 into its upper position, thus interrupting the flow of water from the tank B to the reservoir C. When this pressure is interrupted, as, for example, by the closing of the steam valve 28, the plunger 41 will immediately drop into its lower position, thus permitting the heating fluid to drain from the tank B into the reservoir C. The plunger may be caused to drop or uncover the openings 39 and 40 in any suitable manner, for example, by gravity and by the pressure of water acting on the plunger, as in the construction shown. Preferably, the liquid level does not drop below the bottom of the vat A, so that a small portion of the lower part of the vat A will be exposed to the heating fluid, to maintain the liquid in the vat A at the desired temperature. For example, when liquid has been drained, the liquid level in the tank and reservoir may be approximately as indicated by broken lines 45 in Fig. 3. Any other means for enabling the heating fluid to be quickly withdrawn from the tank B into a storage reservoir when the desired temperature within the vat A has been obtained, may be provided.

By means of the heating and circulating system described, an active upward flow of liquid in the tank results, which has a very desirable heating effect on the liquid in the vat A, since the greatest amount of heat is applied to the bottom of the vat A, thus causing a thermal circulation of liquid within the vat A to supplement any agitation of liquid in the vat. The heating fluid in the tank B, on the other hand, is all moved in an upward direction by the action of the jets, so that the tendency of the cooler liquid to drop toward the bottom of the tank is overcome by these jets, and the cooler liquid is consequently removed from the top of the tank by the overflow pipes. The arrangement for introducing the heating fluid at the lower end of the tank also lends itself well to the reinforcement of the tank by the channel members 7, 8 and 9 at those portions of the tank which are subjected to the greatest pressure, and therefore, have the greatest need for reinforcement.

By instantly withdrawing liquid from the tank, when the desired temperature of the liquid in the vat has been obtained, an accurate control of the temperature of the liquid in the vat can be secured and overheating is positively prevented. The device for withdrawing the liquid from the tank is simple and inexpensive and operates without depending upon manual operation. By storing the liquid in the reservoir C, after the desired temperature of the liquid in the vat A, has been obtained, the heat in this liquid is conserved and available when the next batch of cold liquid is introduced into the tank A.

While hand-operated steam valves 28 and 32 are shown in the drawing, yet it will be obvious that when the heater is operated thermostatically, mechanically or electrically operated valves may be used in place of those shown.

I claim:

1. A fluid heating and circulating system for heaters, including a container for the liquid to be heated and a tank into which said container extends and which forms with said container a space for the circulation of heating fluid, means for admitting heating fluid in the lower portions of said space and directing said heating fluid upwardly, and means at the upper portion of said space for withdrawing fluid therefrom.

2. A fluid heating and circulating system for heaters, including a container for the liquid to be heated and a tank into which said container extends and which forms with said container a space for the circulation of heating fluid, and means for introducing heating fluid in the lower portion of said space and for withdrawing fluid from the upper portion thereof.

3. A fluid heating and circulating system for heaters, including a container for the liquid to be heated and a tank into which said container extends and which forms with said container a space for the circulation of heating fluid, means for introducing heating fluid in the lower portions of said space, and an overflow duct for withdrawing fluid from the upper portion of said space.

4. A fluid heating and circulating system for heaters, including a container for the liquid to be heated and a tank into which said container extends and which forms with said container a space for the circulation of heating fluid, means for introducing heating fluid in the lower portions of said space, an overflow duct for withdrawing fluid from the upper portion of said space, and means for heating fluid overflowing the upper portion of said tank and returning the same to the lower portion thereof.

5. A heater, including a tank for the heating fluid and a container for the material to be heated extending into said tank, a combined fluid circulating and heating system including a reservoir into which fluid is discharged from said tank and which is formed in the lower portion of said tank and separated from the tank by a partition, means for returning the fluid from said reservoir to said tank, and means for imparting heat to said fluid before returning the same to said tank.

6. A heater, including a tank for water and a container for the material to be heated extending into said tank, a steam injector nozzle arranged to supply heat to the water in said tank and for discharging the heating fluid into the lower portions of said tank, and distributing ducts extending lengthwise of said tank in the lower portion thereof and provided with means for distributing the heating fluid to different portions of the tank lengthwise thereof.

7. A pasteurizer, including a tank for heating fluid, a vat for the liquid to be pasteurized extending into said tank and forming with said tank a space for the circulation of pasteurizing fluid, distributor ducts arranged at opposite sides of said tank and in the lower portions thereof and provided with apertures for discharging heating fluid at intervals into said space, and an injector nozzle discharging heating fluid into fluid from said tank and discharging the mixed fluids into all of said distributor ducts to introduce the same into said tank and to produce circulation in said space.

8. A heater, including a tank for heating fluid and a container for material to be heated extending into said tank, means for introducing heating fluid into said tank, a drain passage for draining liquid from said tank and a valve in said passage held in closed position by the pressure of fluid introduced into said tank, said valve opening when the introduction of fluid to said tank ceases.

9. A heater, including a tank for heating fluid and a container for material to be heated extending into said tank, an injector for discharging heating fluid into said tank, a drain passage for draining heating fluid from said tank, a valve in said drain passage, said valve normally occupying an open position and being moved into closed position by the pressure of fluid discharged by said injector.

10. A heater, including a tank for heating fluid and a container for material to be heated extending into said tank, means for introducing heating fluid into said tank, and means for draining a portion of the heating fluid from said tank when the supply of heating fluid to said tank is interrupted, and leaving in said tank sufficient heating fluid to impart heat to the bottom portion only of said container.

11. A heater, including a tank for heating fluid and a container for material to be heated extending into said tank, means for introducing heating fluid into said tank, means for draining fluid from said tank when said means for introducing heating fluid into said tank ceases to function, and a storage reservoir into which said fluid is drained, said means for introducing heating fluid from said tank withdrawing heating fluid from said reservoir.

12. A heater, including a tank for heating fluid and a container for material to be heated extending into said tank, a storage reservoir for heating fluid arranged at a lower level than said tank to receive the greater part of the fluid from said tank by gravity, means for withdrawing heating fluid from said reservoir and discharging the same to said tank, means for imparting heat to said fluid before discharging the same into said tank, and an overflow duct discharging fluid from said tank to said reservoir.

13. A heater, including a tank for heating fluid and a container for material to be heated extending into said tank, a storage reservoir for heating fluid, means for withdrawing heating fluid from said reservoir and discharging the same to said tank, means for imparting heat to said fluid before discharging the same into said tank, an overflow duct discharging fluid from said tank to said reservoir, and means for draining liquid from said tank into said reservoir when the discharge of fluid into said tank is interrupted.

14. A pasteurizer, including a tank for heating fluid, a vat for the liquid to be pasteurized extending into said tank and forming with said tank a space for the circulation of pasteurizing fluid, a reservoir arranged beneath said pasteurizing tank, an overflow pipe having its opening in the upper portion of said tank and discharging heating fluid into said reservoir, a drain passage connecting said tank near the lower portion thereof with said reservoir, means for introducing heating fluid into said tank, and means for closing said drain passage when fluid is being introduced into said tank and for permitting said drain passage to open when the flow of fluid into said tank is interrupted.

15. A pasteurizer, including a tank for heating fluid, a vat for the liquid to be pasteurized extending into said tank and forming with said tank a space for the circulation of pasteurizing fluid, a reservoir arranged beneath said tank, means for discharging fluid from said tank to said reservoir, means for withdrawing fluid from said reservoir and discharging the same to said tank, means for imparting heat to the fluid before the same is discharged to said tank, and means for discharging a portion of the fluid from said tank to said reservoir when said discharging means ceases to operate, said portion of fluid remaining in said tank serving to impart a greatly reduced amount of heat to said vat.

16. A pasteurizer, including a vat for the liquid to be pasteurized, a tank into which said vat extends and which forms with said vat a space for the circulation of a fluid, and means for introducing said fluid in the lower portion of said space and for withdrawing fluid from the upper portion thereof.

17. A heater, including a tank for heating fluid and a container for material to be heated extending into said tank, means for introducing heating fluid into said tank, means for maintaining the liquid in the tank at a level extending to the upper portion of said container, and means for draining fluid from said tank when said means for introducing heating fluid into said tank ceases to function.

LAWRENCE J. MARINGER.